(12) United States Patent
Buerger et al.

(10) Patent No.: US 7,962,152 B2
(45) Date of Patent: Jun. 14, 2011

(54) LOCATION DETERMINATION FOR WIRELESS MOBILE DEVICES

(75) Inventors: Christian A. Buerger, Woodland Hills, CA (US); Gregory Paul Hayes, Santa Monica, CA (US); Eugene Koh, Los Angeles, CA (US); Seung June Oh, Santa Monica, CA (US)

(73) Assignee: Virgin Mobile USA, L.P., Warren, NJ (US)

( * ) Notice: Subject to any disclaimer, the term of this patent is extended or adjusted under 35 U.S.C. 154(b) by 996 days.

(21) Appl. No.: 11/805,736

(22) Filed: May 24, 2007

(65) Prior Publication Data

US 2008/0293431 A1 Nov. 27, 2008

(51) Int. Cl.
*H04W 24/00* (2009.01)
(52) U.S. Cl. .................. 455/456.1; 455/402.2; 455/440; 455/456.3
(58) Field of Classification Search .................. 455/428, 455/433–453, 456.1–457
See application file for complete search history.

(56) References Cited

U.S. PATENT DOCUMENTS

| | | | |
|---|---|---|---|
| 6,289,280 B1 | 9/2001 | Fernandez-Corbaton et al. | 701/214 |
| 6,449,486 B1 | 9/2002 | Rao | |
| 6,556,832 B1 | 4/2003 | Soliman | 455/456 |
| 6,710,740 B2 * | 3/2004 | Needham | 342/357.13 |
| 6,912,395 B2 | 6/2005 | Benes et al. | 455/456.1 |
| 6,961,543 B2 | 11/2005 | Hunzinger | 455/67.11 |
| 6,988,026 B2 | 1/2006 | Breed et al. | 701/29 |
| 7,123,188 B2 | 10/2006 | Needham | 342/357.13 |
| 7,262,731 B2 | 8/2007 | Han | 342/357.02 |
| 7,613,469 B2 * | 11/2009 | Hulkkonen et al. | 455/456.5 |
| 2005/0250516 A1 | 11/2005 | Shim | |
| 2005/0255866 A1 | 11/2005 | Dupuy et al. | |
| 2006/0250302 A1 | 11/2006 | Park et al. | |
| 2008/0113661 A1 * | 5/2008 | Repka | 455/418 |

* cited by examiner

*Primary Examiner* — Dai A Phuong

(57) ABSTRACT

In part, the invention relates to a method for generating location data using a wireless mobile device, the wireless mobile device adapted to communicate with a plurality of location services, each service associated with one of a plurality of networks. In one embodiment, the method comprises the steps of: selecting a first location service from the plurality of location services; transmitting a first request for location data to the first location service; if the first request fails, selecting a second location service from the plurality of location services; and receiving location data from one of the first and the second location services.

18 Claims, 5 Drawing Sheets

LOCATION DETERMINATION FOR WIRELESS MOBILE DEVICES

FIELD OF THE INVENTION

The invention relates to the field of location determination using electronic devices. Specifically, the invention relates to systems, devices, and methods for location determination using a wireless mobile device adapted to communicate with multiple networks and/or multiple location determination services.

BACKGROUND OF THE INVENTION

The Global Positioning System ("GPS") is currently the most well-known location information service system. GPS uses a satellite network to transmit signals to individual GPS receivers on the ground which then calculates receiver positions based on these signals. As the popularity of GPS has grown, GPS receivers are no longer only found in traditional stand-alone devices. The receivers are integrated as components in many different types of multi-functional devices. Some of the personal wireless mobile devices, such as cellular phones, have incorporated GPS receivers to allow users to instantaneously determine their locations and obtain directions.

In addition to GPS, Wi-Fi (IEEE 802.11) based location determining services have been developed in recent years. Software-only positioning systems now exist that leverage a nationwide database of known Wi-Fi access points to calculate the location of any Wi-Fi enabled device. The major benefits of Wi-Fi based location services, in comparison with GPS based location services, are that the Wi-Fi based service is less expensive and more accurate. In addition, because Wi-Fi based positioning system has no line of sight requirements, it has a distinct performance advantage over GPS when used indoors.

Currently, some single mode cellular mobile terminals incorporate a variety of GPS-based location determination technologies and systems. However, with the introduction of dual-mode 802.11/cellular mobile terminals, there is a need to utilize emerging Wi-Fi based location determination technologies and systems in conjunction with the existing cellular location determination technologies.

The present invention provides systems, devices, and methods that utilize dual-mode and multi-mode mobile devices for location determination.

SUMMARY OF THE INVENTION

The invention relates generally to a method and system for location determination using a multi-mode wireless mobile device adapted to communication with a plurality of different types of networks. In one embodiment, the invention relates to methods for enhancing the location determining functionality of a dual-mode mobile terminal. These enhancements can be achieved by providing network selection and signal failure detection features as outline herein.

In one aspect, the invention relates to a method for generating location data using a wireless mobile device, the wireless mobile device adapted to communicate with a plurality of location services, each service associated with one of a plurality of networks. In one embodiment, the method comprises the steps of: selecting a first location service from the plurality of location services; transmitting a first request for location data to the first location service; if the request fails, selecting a second location service from the plurality of location services; and receiving location data from one of the first and the second location services. In one embodiment, the location data is selected from the group consisting of latitude data, longitude data and altitude data. Relaying location data to an application on the wireless mobile device can be performed as an additional step. Further, forwarding the location data to an application on the wireless mobile device can also be performed as an additional step.

In another embodiment, the method further comprises the step of ranking the plurality of location services, wherein the first location service is the highest ranked location service and the second location service network is the second highest ranked location service. In various embodiments, the ranking of the location services may be based on accuracy of the services, response time of the service, or the cost of using each of the plurality of location services.

In yet another embodiment, at least one of the location services accesses an IEEE 802.11 network. In yet another embodiment, at least one of the location services accesses a cellular network. In yet another embodiment, at least one of the location services accesses an IEEE 802.16e network.

In yet another embodiment, the invention relates to a method for generating location data using a wireless mobile device, the wireless mobile device adapted to communicate with a plurality of location services. The method comprises the steps of: selecting a first location service network from the plurality of location service networks; transmitting a first request for location data to the first location service network; detecting if the first request was processed; if the first request was processed, receiving location data from the selected location service network; and if the first request was not processed, transmitting a second request for location data to a second location service network of the plurality of location service networks.

In another aspect, the invention relates to a wireless mobile device. In one embodiment, the wireless mobile device includes a communication subsystem, the subsystem adapted to communicate with a first location service and a second location service; and a processor configured to communicate with the subsystem to acquire location data from at least one of the first and second location services, wherein the first location service accesses a first network and the second location service accesses a second network.

In another embodiment, the subsystem of the wireless mobile device is programmed with failover logic adapted to select from the first and the second location networks in response to a failover event. In various embodiments, the failover event may be an error signal, a timeout event, network availability, or a requested user action.

In yet another embodiment, the wireless mobile device includes a first communication component adapted to communicate with a first location service network; a second communication component adapted to communicate with a second location service network; and a processor configured to communicate with the first and the second communication components to acquire location data from at least one of the first and second location service networks. The first and second location service networks are different types of networks. The processor receives location data from the first location service network through the first communication component when the first location service network is in communication with the first communication component. The processor and associated network interfaces receive location data from the second location service network through the second communication component when the first location service network is not in communication with the first communication component.

BRIEF DESCRIPTION OF THE DRAWINGS

The foregoing and other objects, aspects, features, and advantages of the invention will become more apparent and may be better understood by referring to the following description taken in conjunction with the accompanying drawings, in which.

DETAILED DESCRIPTION OF THE PREFERRED EMBODIMENTS

The present invention will be more completely understood through the following detailed description, which should be read in conjunction with the attached drawings. In this description, like numbers refer to similar elements within various embodiments of the present invention. Within this detailed description, the claimed invention will be explained with respect to preferred embodiments. However, the skilled artisan will readily appreciate that the methods and systems described herein are merely exemplary and that variations can be made without departing from the spirit and scope of the invention.

In general, the systems of the present invention provide enhanced location services to a wireless mobile device user by selectively accessing multiple location service networks built on different technologies. The systems disclosed herein deliver better location detection service than the traditional GPS and at a significantly lower operational cost. This is achieved by leveraging Wi-Fi networks, cellular networks, and others, while at the same time, providing the enhanced coverage by using the GPS, or other location services, as a backup system. The backup features are engaged when the Wi-Fi network and/or its associated location based service (LBS), or other networks/LBSs, are not available.

In the following discussion of illustrative embodiments, a "mobile device" includes, without limitation, mobile phones, personal digital assistants, hand-held computers, ultra-mobile personal computers, and the like. Embodiments of the present invention relate to systems and methods for providing location determination features to a user that are fast, reliable, and consistently available. As multiple location based services, such as, for example, GPS, Wi-Fi, and cellular, can be used by a mobile device to determine its position, establishing a hierarchy by which these different modes of location determination can be used is described herein. In the event that one or more LBS or their associated networks are not available or if one is better for a particular purpose, the techniques disclosed herein can rank, select, and detect the suitability of a given LBS or network to enhance the user's experience with the mobile device.

Figure 1A:
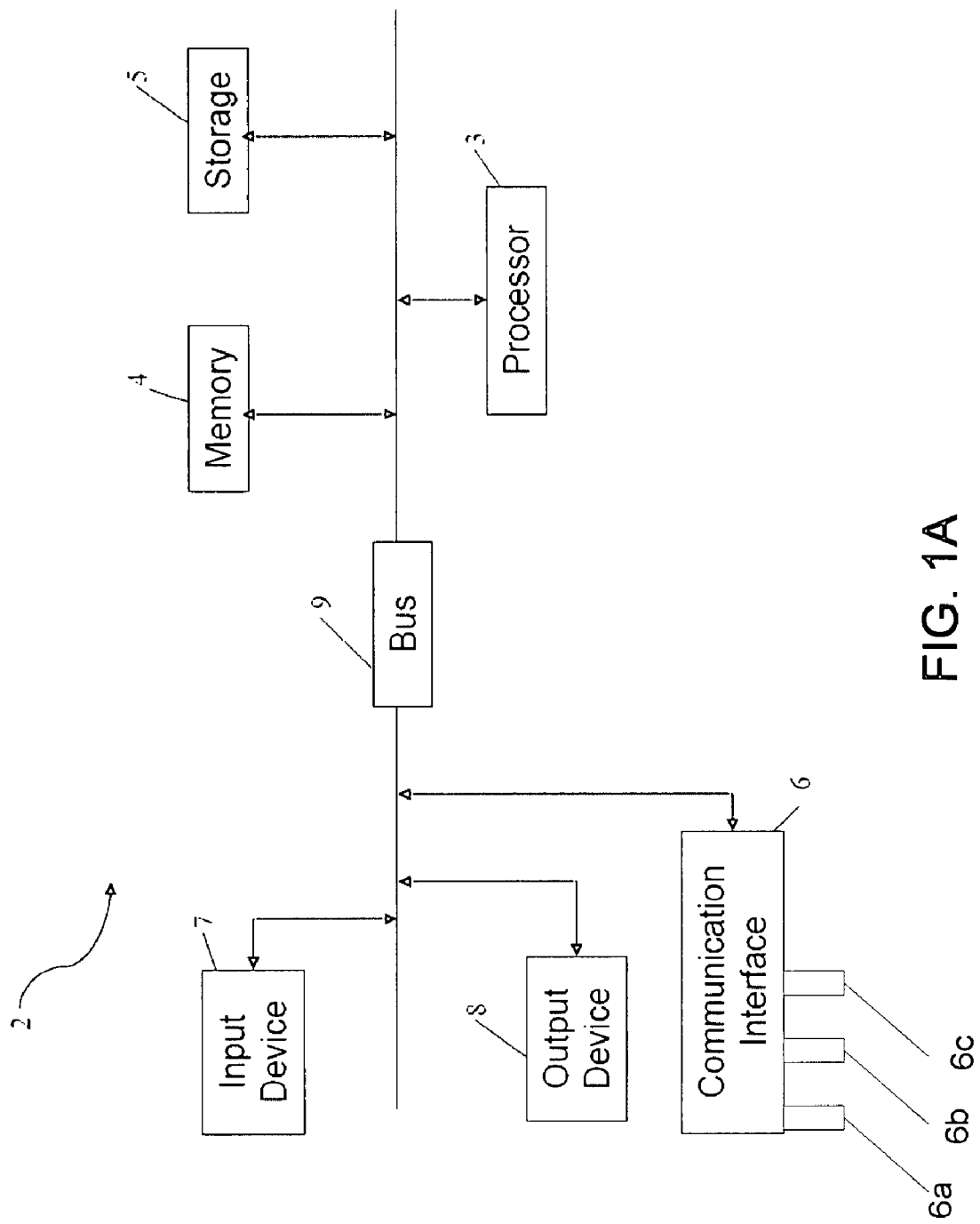
FIG. 1A is a functional block diagram that illustrates the components of an exemplary system that includes multi-mode location determining network interface components for practicing an embodiment of the present invention.

FIG. 1A is a functional block diagram that illustrates the components of an exemplary mobile device for practicing an embodiment of the present invention. Mobile device preferably includes a processing unit or processor 3, a system memory 4, a disk storage 5, a communication interface 6, an input device 7, an output device 8, and a system bus 9. System bus 9 couples system components including, but not limited to, system memory 4 to processing unit 3. The processing unit 3 can be any of various available processors.

Input device 7 may be a keyboard, thumbboard, or touch-screen (for use with a stylus) that are used to receive data from a user. In addition, input device 7 can also include a plurality of other inputs or controls for adjusting and configuring one or more aspects of the present invention including voice commands. Output device 8 may be a display device, such as an LCD or LED display screen, that can display one or more display objects (not shown) such as configurable icons, buttons, input boxes, menus, tabs, key labels and so forth having multiple configurable dimensions, shapes, colors, text, data and sounds to facilitate operations with mobile device 2.

Communication interface 6 facilitates data exchange over a variety of wireless networks. As shown, the communication interface 6 can include a plurality of components or operational features 6a, 6b, and 6c (generally 6) that allow the communication device to select between a plurality of location services as outlined below. For example, 6a may correspond to a cellular LBS module, while components 6b and 6c may correspond to Wi-Fi LBS and traditional GPS or enhanced GPS modules, respectively. The hardware and software necessary for connection to the communication interface 6 includes, for exemplary purposes only, internal and external components that transmit and receive data wirelessly using a plurality of standard protocols including, for example, GSM, CDMA, W-CDMA, Bluetooth, Wi-Fi, IrDA, WiMAX, WiBRO or through other known wireless standards.

Storage 5 may include removable or fixed, volatile or non-volatile or permanent or re-writable computer storage media. The computer readable medium can be any available medium that can be accessed by a general purpose or special purpose mobile device. By way of example, and not limitation, such a computer readable medium can comprise flash memory, RAM, ROM, electrically erasable programmable read only memory (EEPROM), optical disk storage, magnetic disk storage or other magnetic storage devices, or any other medium that can be used to store digital information on a mobile device.

It is to be appreciated that FIG. 1A describes software that acts as an intermediary between users and the basic resources described in mobile device 2. Such software preferably includes an operating system. The operating system, which can be resident in storage 5, acts to control and allocate resources of mobile device 2. System applications take advantage of the management of resources by the operating system through program modules and program data stored either in system memory 4 or on disk storage 5. Furthermore, it is to be appreciated that the present invention can be implemented with various operating systems or combinations of operating systems. The methods of ranking and selecting LBSs and/or detecting errors that indicate when a change in LBS type is desirable can be implemented in software resident in memory that interacts with the communication interface and processor and/or other device components as appropriate.

The computer readable medium tangibly embodies a program, functions, and/or instructions that cause the computer system to operate in a specific and predefined manner as described herein. Those skilled in the art will appreciate, however, that the process described below relating to location detection using selective service connection, detection, and ranking, as well as other features recited herein, may be implemented at any level, ranging from hardware to application software and in any appropriate physical location. For example, the present invention may be implemented as software code to be executed by mobile device using any suitable computer language and may be stored on any of the storage media described above, or can be configured into the logic of mobile device 2. Such software code may be executed by mobile device using any suitable computer language such as, for example, Java, Javascript, C++, C, C#, Perl, Visual Basic, Transact/Structure Query Language (T/SQL), database languages, APIs, various system-level SDKs, assembly, firmware, microcode, and/or other languages and tools.

These are representative components of a mobile device whose operation is well understood. Furthermore, those of ordinary skill in the art will appreciate that mobile device 2 of FIG. 1A is exemplary only and that the present invention can operate within a number of different mobile devices.

Figure 1B:
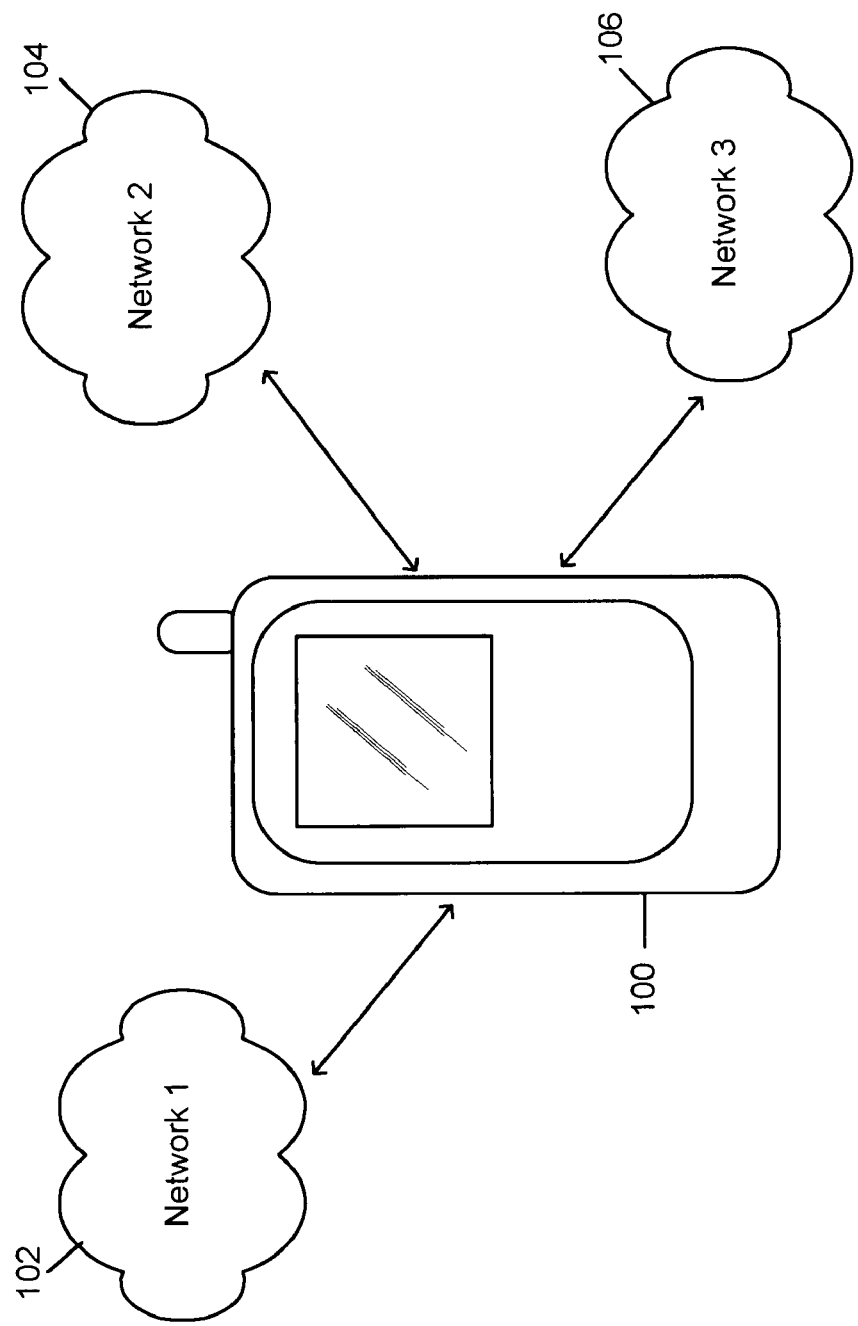
FIG. 1B is a diagram illustrating a system for determining the location of a wireless mobile device using multiple location services and associated networks, according to an embodiment of the invention.

FIG. 1B illustrates the components of an exemplary mobile device 100 for practicing an embodiment of the present invention. In the illustrated embodiment, the mobile device preferably includes a display, a processor, a keypad, and one or more network interface components adapted to access a plurality of location determination services associated with multiple networks using a network interface/communication interface.

Specifically, FIG. 1B illustrates a wireless mobile device 100 in communication with multiple networks 102, 104, 106. Each of the three networks shown is associated with at least one LBS. In various embodiments, the wireless mobile device 100 may be a mobile phone (as illustrated), personal digital assistants, hand-held computers, ultra-mobile personal computers, and the like. The wireless mobile device includes a communication subsystem adapted to communicate with the multiple networks 102, 104, and 106. An example of such a device is a dual mode 802.11/cellular phone, which is capable of receiving Wi-Fi signals in addition to the basic cellular network signals.

Given the geographic placement of Wi-Fi hotspots and the cells associated with different towers and base stations used for cellular phone service, both cellular services and Wi-Fi services can be used as location determination services in accordance with the teachings described herein. Thus, a mobile device with GPS, Wi-Fi, and cellular capabilities can act a multi-mode location determining device. However, the term dual mode or multi-mode is not limited to a particular grouping of networks or service types. Thus, multi-mode can refer to the ability of the mobile device to access two or more location determination services such as an LBS and/or their associated location data providing services.

Each of the networks 102, 104, 106 provides a location service that allows the user of the wireless mobile device 100 to determine his or her current location and calculate directions to specified destinations. The networks 102, 104, 106 each utilize different OSI Layer 1 and Layer 2 technologies. For example, network1 102 may be a IEEE 802.11 Wi-Fi network, network2 104 may be a cellular network that utilizes the devices position to different cells to generate positional information, or it may be an enhanced service that combines cellular data with GPS data to provide location service, and network3 106 may be a IEEE 802.16e WiMAX network. The location information may come from any of the networks based on the availability of the networks and preprogrammed fallback logics that are designed to optimize the location service.

When the device 100 is within a particular range of some or all of the networks 102, 104 and 106, the device 100 is programmed to automatically select a network based on a predetermined ranking of the networks or another LBS criteria. The LBS criteria can be a function of the particular software application that is collecting the location data on the device 100. Because the networks 102, 104, 106 are based on different technologies, each has its own advantages over the others. For example, the Wi-Fi network 102 based location service is more accurate and less expensive than the other service, but the wireless network based service may be more ubiquitous than the Wi-Fi based service. The wireless mobile device 100 may also provide the option of allowing the user to set a default location service and manually switch to a different one when necessary. Network selection and fallback logics will be further discussed below.

As mentioned above, to communicate with the different networks 102, 104, 106, the wireless mobile device 100 can be a multi-mode device configured with multiple network interfaces, one for communicating with each location service network. This is because that the networks 102, 104, 106 are built based on different standards and have different protocols. Consequently, a device 100 capable of communicating with the networks 102, 104, 106 has to be able to switch between the different modes to transmit data in the format compatible with a particular network. One existing multi-mode device is the aforementioned dual-mode 802.11/cellular phone. A typical dual-mode 802.11/cellular phone has most of the common features of a cell phone, including one or more keypads, at least one screen, a speaker, a microphone and an antenna. What distinguishes the dual-mode phone from an ordinary phone are the additional components it has which allow it to switch between different networks when in use. In one embodiment, the present invention utilizes the mode-switching capability of such dual-mode devices for the purpose of obtaining location data. Generally, the aspects and embodiments described herein are extendible to any multi-mode device that can switch between networks in response to processor and software instructions and (2) collect location data from an LBS.

Figure 2:
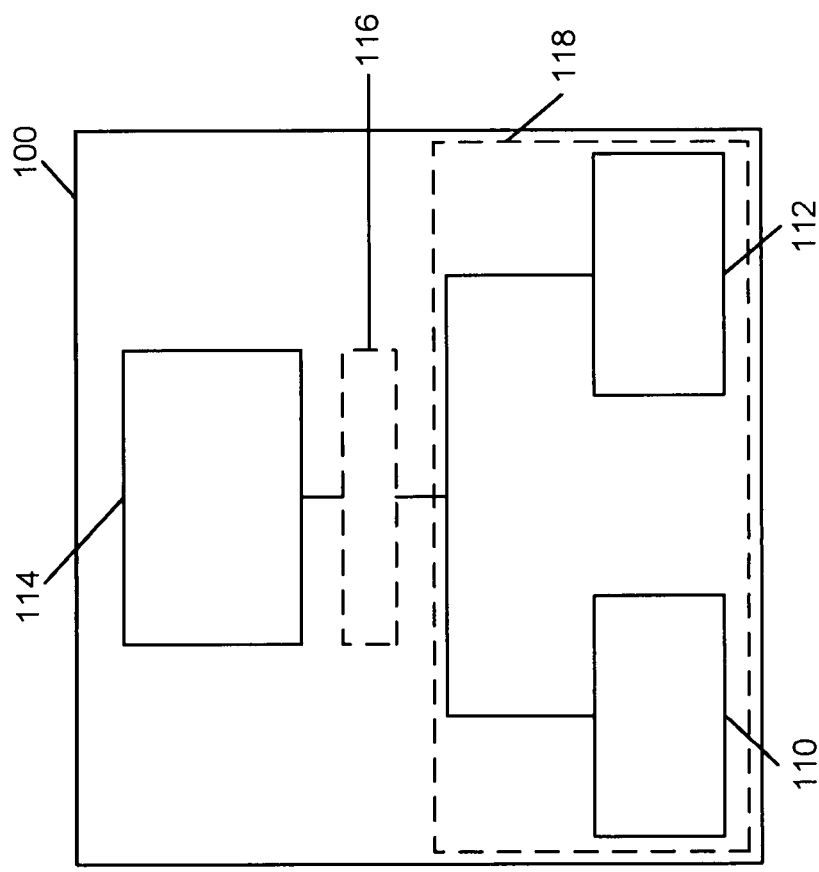
FIG. 2 is a diagram illustrating the components of a wireless mobile device which may be used to obtain location information, according to an embodiment of the invention.

FIG. 2 illustrates components of an exemplary device 100, such as a dual-mode wireless device, suitable for retrieving location data from different networks, according to one embodiment of the invention. Referring to FIG. 2, the device 100 includes a processor 114, an optional network interface component 116 and a communication subsystem 118. In one embodiment, the network interface component can be part of, or comprise the entire subsystem 118. The processor 114 processes a user request for location service, selects a network from substantially all compatible networks, and forwards the request to the selected network. The network interface component 116 serves as a gateway between the processor 114 and the communication subsystem 118. The network interface component 116 can convert the request into the correct data format compatible with the network selected by the processor 114 and for passing the formatted request to the corresponding communication subsystem 118.

Within the device embodiment depicted in FIG. 2, the communication subsystem 118 may further include two communication modules 110, 112, each configured to send and receive information from and to its corresponding network. For example, when the 802.11 Wi-Fi network is selected by the processor, the request for location service data is passed to the first communication module 110. The first communication module 110 then searches for an available Wi-Fi location service network in the area. These two module 110, 112 can be implemented as software resident in memory in some embodiments. If one is found, the first communication module 110 transmits the request to the Wi-Fi network and receives the location data back from the Wi-Fi based location service. The location data may be in the format of latitude, longitude and altitude coordinates, or in any format that can be processed by the processor 114 of the device 100. Once the first communication module 110 receives the location data, it passes the data back to the processor via the network interface component 116. The different communication subsystems also monitor the active network or active LBS service to determine if a switch to a new network is required.

In this example, if no Wi-Fi network is detected by the first communication module 110 in a limited time period, the first communication module 110 reports the timeout event to the processor 114 which then resends the request to the second communication module 112. The second communication module 112 then initiates a search for a cellular signal from a cellular network which provides GPS based location service or another cellular based LBS. If the cellular network is available, the request is transmitted by the second communication module 112 via the cellular network to obtain the generated location coordinates. The coordinates are transmitted back to the second communication module 112 via the cellular network. Similarly, the second communication module 112 then forwards the location data back to the processor 114. In various devices, the communication modules 110, 112 may be hardware components such as application-specific integrated circuits, or implemented by software applications or libraries stored in the memory (not shown) of the device 100.

The location data is first converted by the network interface component 116 to a format recognizable by the processor 114. The processor 114, upon receiving the data, may either format the data for displaying on the screen of the cellular device 100 or send it to various applications stored in the memory, for example, to generate other information, such as directions to another location, local weather data, or a list of nearby points of interests.

FIG. 2 illustrates one embodiment of a multi-mode wireless mobile device—the dual-mode phone. The dual-mode phone includes two communication modules 110, 112 and thus is only capable of accessing two different types of networks for obtaining location service. A person with ordinary skill in the art could easily add more communication modules so that the device may receive location data from additional networks, such as an 802.16e WiMAX network.

Figure 3:
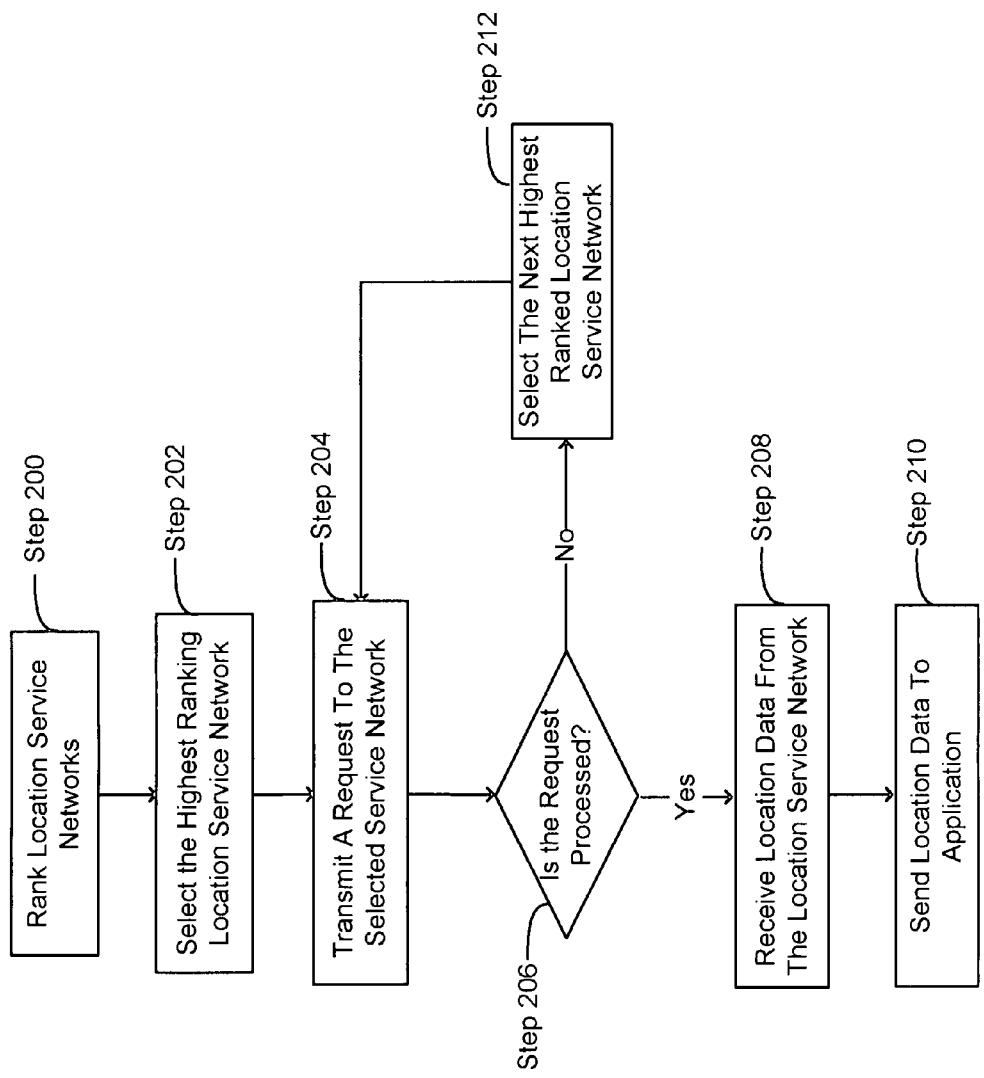
FIG. 3 is a flow chart illustrating the steps of using a wireless mobile device to obtain location information, according to an embodiment of the invention.

FIG. 3 is a flow chart illustrating the steps of a method of obtaining location information using a wireless mobile device according to an embodiment of the invention. In operation, a user of a multi-mode wireless mobile device makes a request for their current location, either by a voice command or by selecting an option from a menu on the display of the device. As illustrated, the multi-mode wireless device is programmed to generate a ranked list of all compatible location service networks (step 200). In one embodiment, this ranked list is pre-ranked based on a set of criteria, such as a function of the applications that will use the location data. The list may be stored in the memory of the device or dynamically updated by a remote wireless network server. Upon receiving the request for location data, the wireless device selects the highest ranked location service on the list (step 202) and transmits a request to the selected location service via its dedicated network (step 204). If the request is processed by the network (step 206), the wireless device receives a response that includes the location data from the location service network (step 208). If the request is not processed because the network is not available where the user is or the user manually cancels the request or the request has timed-out, the wireless device automatically retrieves, from the ranked list of location services, the next highest ranked service (step 212) and retransmits the request to the second service via the second service's corresponding network (step 204). This process is repeated until the wireless device receives a response with the location data from at least one of the location services or the list of services is exhausted.

If after all the services on the list have been contacted and no response received, the wireless device will notify the user that location information cannot be retrieved, either by a voice message or a text message displayed on the screen of the wireless device. If location data is received from one of the services, the data will be processed (step 210) and formatted to be displayed on the screen. The wireless device may have a number of different applications stored in its memory that utilizes the location data to generate other information such as nearby points of interest or directions to a second location.

In a preferred embodiment, the wireless device is a dual-mode Wi-Fi/CDMA mobile device. The dual mode phone is adapted to communicate with both the Wi-Fi network and the cellular network based GPS location services. Since the Wi-Fi network provides a less expensive and more accurate location service, the dual mode phone is programmed to search for a Wi-Fi signal first, upon receiving a user request for location information (step 301). If the phone is within a Wi-Fi hotspot, it invokes a Wi-Fi location database query for the current position (step 302). In one embodiment, the query is based on the Basic Service Set Identifier ("BSSID"), a unique identifier of a 802.11 network. In another embodiment, the query is based on the Received Signal Strength Indication ("RSSI") which indicates the strength of the signal received by the 802.11 chipset. The database is populated by an up-to-date information of nationwide Wi-Fi access points which can be used to calculate the approximate location of any device with Wi-Fi capability in close range of the access points. Once the coordinates of the location are calculated, this information is transmitted to the mobile device (step 304) and sent to applications pre-installed on the mobile device for further processing (step 307).

Figure 4:
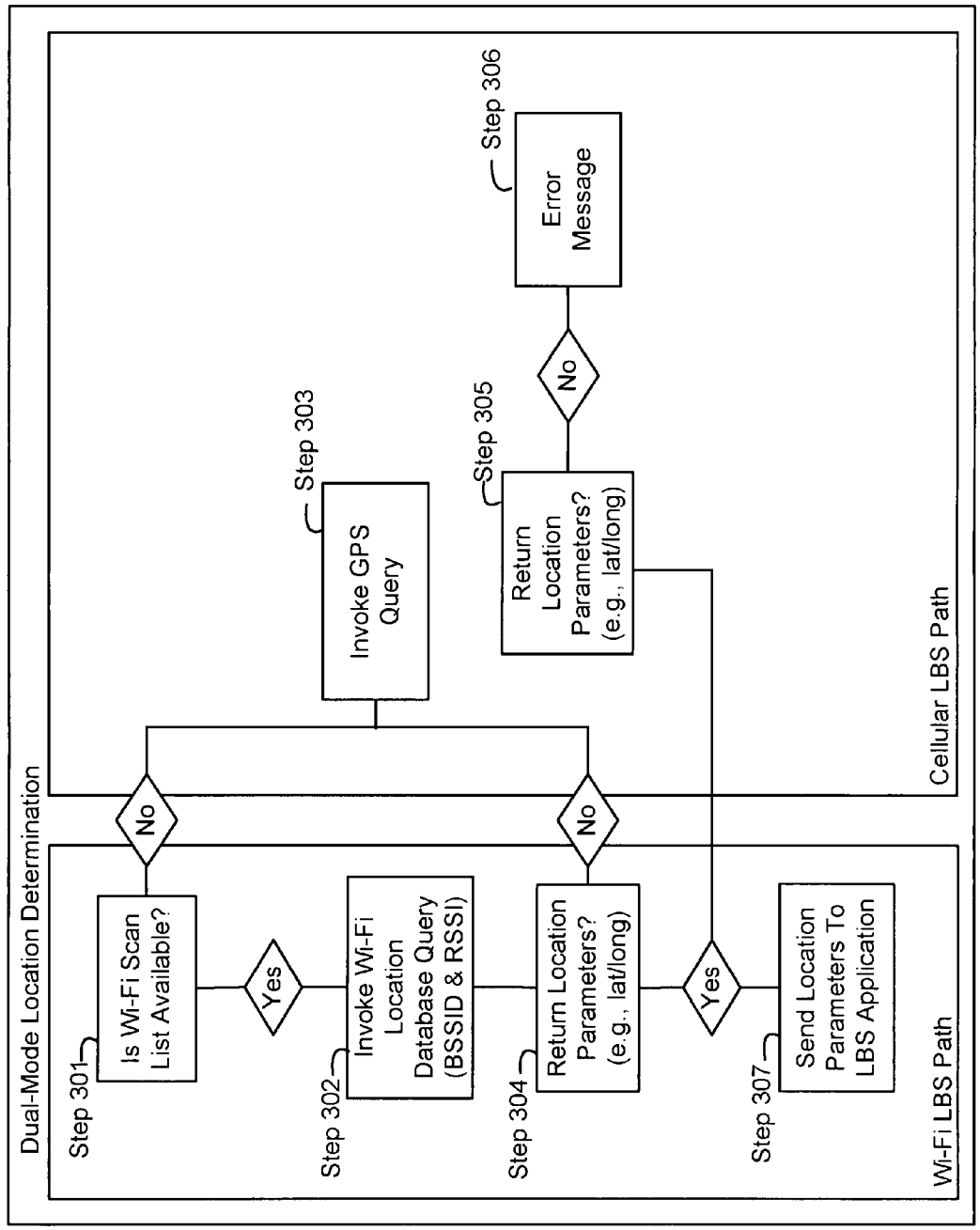
FIG. 4 is a flow chart illustrating a dual-mode Wi-Fi/Code-Division Multiple Access (CDMA) location determination logic, according to an embodiment of the invention.

Although the Wi-Fi network has coverage in most of the metropolitan areas and is expanding to cover more territory, there currently remains a vast number of places, such as rural areas in the U.S, that do not have Wi-Fi access points in close proximity to each other. To resolve this issue, the dual mode mobile device will seamlessly switch to the cellular based GPS network for location information when the phone is used outside of a Wi-Fi coverage area. More specifically, when a request for location information through the Wi-Fi network times out or an error signal is received, the mobile device automatically invokes a GPS query (step 303). If the query is processed properly, location information is returned to the mobile device (step 305) and passed on to the applications on the phone. The location information from GPS may be in the format of longitude and latitude coordinates. The applications may convert the coordinates to more user-friendly format such as street address on a 3-D map displayed on the screen on the mobile device. In a different scenario, when the Wi-Fi network fails to return the location data upon receiving a request, the mobile device will also transmit a second request to the GPS service, as illustrated in FIG. 4. In the event that neither the Wi-Fi network nor the GPS network returns the proper location data, an error message will be generated and displayed to the user (step 306).

As described above, by utilizing multiple location service networks, the method and system of the currently invention not only allows the user to receive accurate location information in a less expensive way, but also provides geographically extensive service by accessing the overlapping the coverage areas of the different networks.

Although the embodiments disclosed above are discussed in the scope of providing solutions in response to a request for a medical service, one of ordinary skill in the art can easily adopt the same methods and systems for the providing of other type of services. Variations, modifications, and other implementations of what is described herein will occur to those of ordinary skill in the art without departing from the spirit and scope of the invention as claimed. Accordingly, the invention is to be defined not by the preceding illustrative description but instead by the spirit and scope of the following claims.

What is claimed is:

1. A method for generating location data using a wireless mobile device, the method comprising the steps of:
   determining whether the wireless mobile device is within a Wi-Fi hotspot by searching for a Wi-Fi signal;
   responsive to the determination that the wireless mobile device is within the Wi-Fi hotspot, transmitting a first request for the location data by submitting a query through the Wi-Fi hotspot to a database for a current location of the wireless mobile device based on at least one of: (1) a Basic Service Set Identifier ("BSSID") of the Wi-Fi hotspot and (2) a Received Signal Strength Indication ("RSSI") of the Wi-Fi signal received by the wireless mobile device from the Wi-Fi hotspot, the database comprising up-to-date information of nationwide Wi-Fi access points;
   responsive to the first request failing, transmitting a second request by submitting a GPS query to a cellular based GPS network;
   receiving the location data from one of the database and the cellular based GPS network; and
   responsive to both the first and the second requests fail, displaying an error message on the wireless mobile device.

2. The method of claim 1 wherein the location data is selected from the group consisting of latitude data, longitude data and altitude data.

3. The method of claim 1 further comprising the step of relaying the location data to an application on the wireless mobile device.

4. The method of claim 1 further comprising the step of forwarding the location data to an application on the wireless mobile device.

5. The method of claim 1 further comprising:
   determining whether the first request fails by detecting that the Wi-Fi hotspot times out or an error signal is received from the Wi-Fi hotspot.

6. The method of claim 1 wherein the cellular network is selected from the group consisting of a GSM network, a W-CDMA network, a CDMA IS 2000 network and a 1xEV-DO network.

7. A wireless mobile device, comprising:
   a communication subsystem, the communication subsystem adapted to communicate with a Wi-Fi network and a cellular based GPS network; and
   a processor configured to communicate with the communication subsystem to acquire location data,
   wherein the communication subsystem is programmed to perform the steps of:
      determining whether the wireless mobile device is within a Wi-Fi hotspot by searching for a Wi-Fi signal;
      responsive to the determination that the wireless mobile device is within the Wi-Fi hotspot, transmitting a first request for the location data by submitting a query through the Wi-Fi hotspot to a database for a current location of the wireless mobile device based on at least one of: (1) a Basic Service Set Identifier ("BSSID") of the Wi-Fi hotspot and (2) a Received Signal Strength Indication ("RSSI") of the Wi-Fi signal received by the wireless mobile device from the Wi-Fi hotspot, the database comprising up-to-date information of nationwide Wi-Fi access points;
      responsive to the first request failing, transmitting a second request by submitting a GPS query to the cellular based GPS network;
      receiving the location data from one of the database and the cellular based GPS network; and
      responsive to both the first and the second requests fail, displaying an error message on the wireless mobile device.

8. The wireless mobile device of claim 7 wherein the location data is selected from the group consisting of latitude data, longitude data and altitude data.

9. The wireless mobile device of claim 7 wherein the communication subsystem is an application-specific integrated circuit.

10. The wireless mobile device of claim 7 wherein the communication subsystem is a software application.

11. The wireless mobile device of claim 7 wherein the communication subsystem is further programmed to perform:
    determining whether the first request fails by detecting that the Wi-Fi hotspot times out or an error signal is received from the Wi-Fi hotspot.

12. The wireless mobile device of claim 7 wherein the cellular network is selected from the group consisting of a GSM network, a W-CDMA network, a CDMA IS 2000 network and a 1xEV-DO network.

13. A non-transitory computer-readable storage medium storing executable computer program instructions for generating location data using a wireless mobile device, the computer program instructions comprising instructions for:
    determining whether the wireless mobile device is within a Wi-Fi hotspot by searching for a Wi-Fi signal;
    responsive to the determination that the wireless mobile device is within the Wi-Fi hotspot, transmitting a first request for the location data by submitting a query through the Wi-Fi hotspot to a database for a current location of the wireless mobile device based on at least one of: (1) a Basic Service Set Identifier ("BSSID") of the Wi-Fi hotspot and (2) a Received Signal Strength Indication ("RSSI") of the Wi-Fi signal received by the wireless mobile device from the Wi-Fi hotspot, the database comprising up-to-date information of nationwide Wi-Fi access points;
    responsive to the first request failing, transmitting a second request by submitting a GPS query to a cellular based GPS network;
    receiving the location data from one of the database and the cellular based GPS network; and
    responsive to both the first and the second requests fail, displaying an error message on the wireless mobile device.

14. The storage medium of claim 13 wherein the location data is selected from the group consisting of latitude data, longitude data and altitude data.

15. The storage medium of claim 13 wherein the computer program instructions further comprises instructions for:

relaying the location data to an application on the wireless mobile device.

16. The storage medium of claim 13 wherein the computer program instructions further comprises instructions for:

forwarding the location data to an application on the wireless mobile device.

17. The storage medium of claim 13 wherein the computer program instructions further comprises instructions for:

determining whether the first request fails by detecting that the Wi-Fi hotspot times out or an error signal is received from the Wi-Fi hotspot.

18. The storage medium of claim 13 wherein the cellular network is selected from the group consisting of a GSM network, a W-CDMA network, a CDMA IS 2000 network and a 1xEV-DO network.

* * * * *